United States Patent Office 3,239,511
Patented Mar. 8, 1966

3,239,511
17β-TETRAHYDROPYRANYLOXY-$\Delta^{1,3}$-5α-ANDROSTADIENE
Alexander D. Cross, Mexico City, Mexico, assignor to Syntex Corporation, Panama, Panama, a corporation of Panama
No Drawing. Filed Aug. 4, 1964, Ser. No. 387,509
1 Claim. (Cl. 260—239.55)

The present invention relates to a novel cyclopentanophenanthrene derivative and to a process for the production thereof.

More particularly the present invention relates to the novel 17β-tetrahydropyranyloxy-$\Delta^{1,3}$-5α-androstadiene.

In accordance with the present invention there has been made the surprising discovery that when $\Delta^{1,3}$-5α-androstadien-17β-ol is transformed into the 17-tetrahydropyranylether thereof, the oral anabolic activity is substantially enhanced. In addition to the latter activity, the novel 17β-tetrahydropyranyloxy-$\Delta^{1,3}$-5α-androstadiene exhibits low androgenicity and is of utility in the treatment of intestinal ulcers and in fertility control.

The novel 17β-tetrahydropyranyloxy-$\Delta^{1,3}$-5α-androstadiene is prepared from $\Delta^{1,3}$-5α-androstadien-17β-ol by treatment under anhydrous conditions with dihydropyrane in the presence of p-toluenesulfonic acid, preferably at room temperature for a period of about 10 hours to 4 days, and, optionally, in a non-polar organic solvent, e.g. a homocylic aromatic solvent such as benzene, toluene or xylene.

The following specific example illustrates the present invention.

Example 2 cc. of dihydropyrane were added to a solution of 1 g. of $\Delta^{1,3}$-5α-androstadien-17β-ol (obtained according to A. D. Cross and A. Bowers U.S. Patent No. 3,156,711, in 15 cc. of benzene and about 1 cc. was distilled to remove moisture. 0.4 g. of anhydrous p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the fractions eluted with hexane from pentane yielded 17β-tetrahydropyranyloxy-$\Delta^{1,3}$-5α-androstadiene.

I claim:
17β-tetrahydropyranyloxy-$\Delta^{1,3}$-5α-androstadiene.

No references cited.

LEWIS GOTTS, Primary Examiner.